United States Patent [19]

Behl

[11] 4,367,268

[45] Jan. 4, 1983

[54] HIGH ENERGY ELECTROCHEMICAL POWER CELL

[75] Inventor: Wishvender K. Behl, Eatontown, N.J.

[73] Assignee: The United States of America as represented by the Secretary of the Army, Washington, D.C.

[21] Appl. No.: 262,282

[22] Filed: May 11, 1981

Related U.S. Application Data

[63] Continuation of Ser. No. 171,515, Jul. 23, 1980, abandoned.

[51] Int. Cl.$^3$ .............................................. H01M 6/14
[52] U.S. Cl. .................................... 429/101; 429/196; 429/199
[58] Field of Search ............... 429/101, 105, 194, 196, 429/197, 199, 218

[56] References Cited

U.S. PATENT DOCUMENTS

| 4,012,564 | 3/1977 | Auborn | 429/194 |
| 4,167,608 | 9/1979 | Giattino | 429/196 |
| 4,262,065 | 4/1981 | Giattino | 429/101 |

OTHER PUBLICATIONS

Behl, "Electrochemical and Chemical Behaviour of Copper and Copper Chlorides", Power Sources Division, U.S. Army Electronics Technology and Devices Laboratory (ERADCOM).

Primary Examiner—Anthony Skapars
Attorney, Agent, or Firm—Nathan Edelberg; Jeremiah G. Murray; Roy E. Gordon

[57] ABSTRACT

An improved high energy electrochemical power cell is obtained by adding cupric chloride to the high surface area carbon black cathode of a lithium-inorganic electrolyte cell.

20 Claims, No Drawings

HIGH ENERGY ELECTROCHEMICAL POWER CELL

This application is a continuation, of application Ser. No. 171,515, filed July 23, 1980, now abandoned.

The invention described herein may be manufactured, used, and licensed by or for the Government for governmental purposes without the payment to me of any royalty thereon.

This invention relates in general to improvements in high energy electrochemical power cells and in particular to an improved lithium-inorganic electrolyte electrochemical cell. This application is copending with U.S. patent application Ser. No. 364,575, filed May 29, 1973 of Behl et al for "Anhydrous Inorganic Electrolyte Electrochemical Cell" and assigned to a common assignee.

BACKGROUND OF THE INVENTION

Lithium-inorganic electrolyte cells are capable of providing high energy densities at ambient temperature. These cells employ a lithium anode, a solution of a highly soluble lithium salt such as lithium tetrachloroaluminate in an oxychloride solvent such as phosphorous oxychloride, thionyl chloride or sulfuryl chloride as the electrolyte and a high surface area carbon black cathode. Such an electrochemical cell is disclosed and claimed in Ser. No. 364,575. A novel feature of these cells is that the oxychloride serves the dual purpose of being a solvent for the lithium salt and acting as a cathode depolarizer. One of the best known of these lithium-inorganic electrolyte cells is the lithium-thionyl chloride cell which has been demonstrated to deliver energy densities of the order of 250 watt hours per pound at ambient temperature.

A difficulty encountered, however, with the carbon black cathodes of the lithium thionyl chloride cells is that while they show slight polarization at low discharge rates, they suffer from excessive polarization at high discharge rates.

It has recently been suggested in Great Britain patent application No. GB 2,003,651A, to L. R. Giattino, published Mar. 14, 1979, that the lithium-thionyl chloride cell could be benefited by adding copper to the cell. The difficulty with copper as the additive, however, is that copper is unstable in the electrolyte and partially goes into solution and is deposited on the lithium anode. This deposition decreases the shelf life of the cell as well as causing a worsening of the voltage delay.

SUMMARY OF THE INVENTION

The general object of this invention is to provide an improved high energy electrochemical power cell. A more particular object of the invention is to provide an improved lithium-inorganic electrolyte cell wherein cathode polarization at high discharge rates is reduced.

It has now been found that the foregoing objects can be attained by adding cupric chloride to a high surface area carbon black cathode of a lithium-thionyl chloride cell.

Cupric chloride is insoluble in thionyl chloride solutions and undergoes reduction in the solid state at about 3.56 volts versus a lithium reference. Thus, when high surface area carbon black cathodes are prepared using about 20 to 25 weight percent of cupric chloride as additive, cupric chloride undergoes reduction concurrently with thionyl chloride and enables the cathode to sustain higher currents without as much polarization as occurs with carbon cathodes made without the cupric chloride additive.

DESCRIPTION OF THE PREFERRED EMBODIMENT

A carbon paste electrode with cupric chloride additive is prepared by adding about 21.7 weight percent of cupric chloride to a high surface area carbon black.

When the carbon black electrode with cupric chloride additive is incorporated in a lithium-thionyl chloride system, experiments with laboratory cells indicates that the carbon black paste electrode containing the cupric chloride additive increases the current carrying capabilities of carbon cathodes as compared to the carbon black paste electrode without the cupric chloride additive. Thus, carbon cathodes containing cupric chloride additive can deliver cell voltages above 3 volts at current densities up to 50 mA/cm$^2$ whereas carbon cathodes without the cupric chloride additive can deliver cell voltages above 3 volts at current densities only up to 25 mA/cm$^2$. The improvement allows the cathode potential and cell voltages to be maintained at high levels out to current densities which are encountered in such applications as laser designators. Moreover, the reduction in cathode polarization decreases release of entropic heat and thereby results in the enhancement of cell safety.

In the high energy electrochemical power cells of the invention, in lieu of thionyl chloride, one may use other oxychloride solvents such as phosphorous oxychloride and sulfuryl chloride. Similarly, in lieu of lithium tetrachloroaluminate as the solute, one may use other highly soluble lithium salts.

The high surface area carbon black used should have a surface area of about 50 m$^2$/gm to 1000 m$^2$/gm. Preferred for use in the invention is Showinigan black, a carbon black having a surface area of about 60 m$^2$/gm.

I wish it to be understood that I do not desire to be limited to the exact details as described for obvious modifications will occur to a person skilled in the art.

What is claimed is:

1. In a high energy electrochemical power cell employing lithium as the anode, a solution of a highly soluble lithium salt in an oxychloride solvent as the electrolyte and a high surface area carbon black cathode, the improvement of preparing the cathode by adding cupric chloride to the high surface area carbon black so that the initial cathode composition is a mixture of high surface area carbon black and cupric chloride and incorporating said cathode in the lithium-oxychloride solvent system to reduce cathode polarization at high discharge rates.

2. A high energy electrochemical power cell according to claim 1 using about 20 to 25 weight percent cupric chloride as the additive.

3. A high energy electrochemical power cell according to claims 1 or 2 wherein the lithium salt is lithium tetrachloroaluminate.

4. A high energy electrochemical power cell according to claim 3 wherein the oxychloride solvent is selected from the group consisting of phosphorous oxychloride, thionyl chloride, and sulfuryl chloride.

5. A high energy electrochemical power cell according to claim 4 wherein the oxychloride solvent is phosphorous oxychloride.

6. A high energy electrochemical power cell according to claim 4 wherein the oxychloride solvent is thionyl chloride.

7. A high energy electrochemical power cell according to claim 4 wherein the oxychloride solvent is sulfuryl chloride.

8. A high energy electrochemical power cell according to claim 4 wherein the high surface area carbon black has a surface area of about 50 $m^2$/gm to 1000 $m^2$/gm.

9. In a high energy electrochemical power cell employing lithium as the anode, a solution of lithium tetrachloroaluminate in thionyl chloride as the electrolyte, and a carbon black cathode having a surface are of about 60 $m^2$/gm, the improvement of preparing the cathode by adding about 20 to 25 weight percent of cupric chloride to the carbon black so that the initial cathode composition is a mixture of carbon black having a surface area of about 60 $m^2$/gm and about 20 to 25 weight percent of cupric chloride and incorporating said cathode in the lithium-oxychloride solvent system to reduce cathode polarization at high discharge rates.

10. A high energy electrochemical power cell according to claims 1 or 2 wherein the oxychloride solvent is selected form the group consisting of phosphorous oxychloride, thionyl chloride, and sulfuryl chloride.

11. A high energy electrochemical power cell according to claim 10 wherein the oxychloride solvent is phosphorous oxychloride.

12. A high energy electrochemical power cell according to claim 10 wherein the oxychloride solvent is thionyl chloride.

13. A high energy electrochemical power cell according to claim 10 wherein the oxychloride solvent is sulfuryl chloride.

14. A high energy electrochemical power cell according to claim 10 wherein the high surface area carbon black has a surface area of about 50 $m^2$/gm to 1000 $m^2$/gm.

15. A high energy electrochemical power cell according to claims 1 or 2 wherein the high surface area carbon black has a surface area of about 50 $m^2$/gm to 1000 $m^2$/gm.

16. A high energy electrochemical power cell according to claim 15 wherein the lithium salt is lithium tetrachloroaluminate.

17. A high energy electrochemical power cell according to claim 16 wherein the oxychloride solvent is selected from the group consisting of phosphorous oxychloride, thionyl chloride, and sulfuryl chloride.

18. A high energy electrochemical power cell according to claim 17 wherein the oxychloride solvent is phosphorous oxychloride.

19. A high energy electrochemical power cell according to claim 17 wherein the oxychloride solvent is thionyl chloride.

20. A high energy electrochemical power cell according to claim 17 wherein the oxychloride solvent is sulfuryl chloride.

* * * * *